United States Patent
Terao et al.

(10) Patent No.: US 7,542,396 B2
(45) Date of Patent: Jun. 2, 2009

(54) INFORMATION RECORDING APPARATUS, INFORMATION RECORDING MEDIUM AND INFORMATION RECORDING MEDIUM

(75) Inventors: Motoyasu Terao, Hinode (JP); Toshimasa Kamisada, Hiratsuka (JP); Shinichi Nakatsuka, Hino (JP); Takeshi Shimano, Yokohama (JP); Hitoshi Ishii, Kaisei (JP); Kazuhiro Soga, Odawara (JP); Yoshiaki Ogino, Ninomiya (JP)

(73) Assignees: Hitachi, Ltd., Tokyo (JP); Hitachi Computer Peripherals Co., Ltd, Kanagawa (JP)

( * ) Notice: Subject to any disclaimer, the term of this patent is extended or adjusted under 35 U.S.C. 154(b) by 701 days.

(21) Appl. No.: 11/209,648

(22) Filed: Aug. 24, 2005

(65) Prior Publication Data

US 2006/0227670 A1   Oct. 12, 2006

(30) Foreign Application Priority Data

Mar. 22, 2005   (JP) ............................ 2005-080847

(51) Int. Cl.
*G11B 7/00* (2006.01)
(52) U.S. Cl. ................... 369/112.01; 369/94; 369/44.23
(58) Field of Classification Search .............. 369/112.1, 369/112.01, 112.03, 112.02, 44.37, 44.23, 369/44.24, 94
See application file for complete search history.

(56) References Cited

U.S. PATENT DOCUMENTS 3,801,966 A    4/1974   Terao
5,202,875 A    4/1993   Rosen et al.
6,680,893 B2 * 1/2004  Ikegame ................. 369/112.01
6,738,322 B2 * 5/2004  Amble et al. ............. 369/44.27
7,133,350 B2 * 11/2006 Aiki ....................... 369/112.01

(Continued)

FOREIGN PATENT DOCUMENTS

JP        3-54740         3/1991

(Continued)

OTHER PUBLICATIONS

Highly Sensitive Amorphous Optical Memory, Terao, et al, Proceedings of the 4th Conference on Solid State Devices, Tokyo, 1972, Supplement to the Journal of the Japan Society of Applied Physics, vol. 42, 1973 pp. 233-238.

(Continued)

*Primary Examiner*—Nabil Z Hindi
(74) *Attorney, Agent, or Firm*—Antonelli, Terry, Stout & Kraus, LLP.

(57) ABSTRACT

To achieve stable, high capacity, high speed recording. Of two light beams emitted from a light irradiation means, one or two beams are made pass through an optical path changeable member whereof at least one of the thickness and refractive index changes continuously or in two or more steps immediately after emission from the light irradiation means, so that a difference is introduced into the optical path length of the two beams, and the focusing point of one beam is made to vary to coincide with a position in the recording layer used for playback or recording. Another light beam is used for servo. Converging of light during recording or read of a multilayer recording medium is performed with higher precision than in the prior art, so higher density, higher capacity recording/playback can be performed.

14 Claims, 16 Drawing Sheets

U.S. PATENT DOCUMENTS

| | | | |
|---|---|---|---|
| 7,230,905 B2 * | 6/2007 | Kim et al. | 369/112.1 |
| 7,263,053 B2 * | 8/2007 | Terao et al. | 369/100 |
| 2003/0218941 A1 | 11/2003 | Terao et al. | |

FOREIGN PATENT DOCUMENTS

| | | |
|---|---|---|
| JP | 5-151591 | 6/1993 |
| JP | 5-151609 | 6/1993 |
| JP | 2002-82360 | 3/2002 |
| JP | 2003-67939 | 3/2003 |
| JP | 2003-346378 | 12/2003 |

OTHER PUBLICATIONS

Advanced Functional Materials, Heuer et al, Electrochromic Window Based On Conducting PEDT/PSS, 2001, 12, No. 2, February pp. 89-94.

* cited by examiner disk moving direction
laser light recording on first layer → reading from second layer moving direction

INFORMATION RECORDING APPARATUS, INFORMATION RECORDING MEDIUM AND INFORMATION RECORDING MEDIUM

CLAIM OF PRIORITY

The present application claims priority from Japanese application JP 2005-080847 filed on Mar. 22, 2005, the content of which is hereby incorporated by reference into this application.

FIELD OF THE INVENTION

This invention relates to an information recording apparatus which records and plays back information using light, and to an information recording method.

BACKGROUND OF THE INVENTION

An optical disk has the essential features that the recording medium (disk) can be removed from the recording/playback device, and the recording medium is economical to manufacture. It is therefore desirable that in an optical disk device, high speed/high density recording can be performed without sacrificing these features.

In order to increase the effective recording density (effective surface density) of an optical disk, it is desirable to employ multilayering which makes use of the far-reaching properties and penetration properties of light. However, in the case of three or more layers, there is a trade-off relationship between the transmittance and recording sensitivity of each layer, and either playback signal quality or recording sensitivity has to be sacrificed.

Techniques have been developed to avoid this trade-off. For example in Patent document 1, a recording medium using an electrochromic material comprises plural layers, a voltage is applied to the recording layer between a pair of terminals to selectively color the recording layer, and information is then recorded by irradiating with laser light.

In Patent document 2, an optical recording medium is described wherein both sides of an electrochromic layer are sandwiched by electrically conductive layers. This document however does not discuss multilayer technology, but materials.

In addition to the above, recording in three dimensions including the thickness direction in a transparent organic material, is also known, but in devices which use two-photon absorption, it was not easy to avoid light scattering by a recording mark in a light-incident-side layer during read. If photopolymerization is used for recording, storage stability and recording sensitivity are poor. On the other hand, in hologram recording, a precise laser wavefront is required, so it is difficult to maintain disk compatibility. Further, a large dynamic range is required of the recording medium, a shielding disk case is required and the system is easily affected by coherent noise.

On the other hand, experimental results have been reported to the effect that when a photoconductor and phase change recording film are sandwiched by transparent electrodes, and the assembly is irradiated by light while applying a voltage with these transparent electrodes, the photocurrent is multiplied so that recording can be performed with a laser light which is two orders of magnitude weaker than when only light irradiation is performed (Patent document 4, Non-patent document 1). This may be suitable for high speed recording, but due to the surface resistance of the transparent electrodes, the size and shape of the recording mark easily changes depending on the position on the disk.

A technique is reported in Patent documents 5, 6 and 7 wherein a spherical aberration correction is performed by inserting a stepped glass plate between a focusing lens and the multilayer disk.

Also, a technique is reported in Patent document 8 wherein a first light source is used for focusing control, and a second light source is used for tracking control.

Patent document 1: JP-A No. 346378/2003
Patent document 2: JP-A No. 82360/2002
Patent document 4: U.S. Pat. No. 3,801,966
Patent document 5: JP-A No. 151591/1993
Patent document 6: JP-A No. 151609/1993
Patent document 7: JP-A No. 54740/1991
Patent document 8: JP-A No. 067939/2003
Non-patent document 1: M. Terao, H. Yamamoto and E. Maruyama: Highly Sensitive Amorphous Optical Memory: supplement to the Journal of the Japan Society of Applied Physics, Vol. 42, pp 233-238
Non-patent document 2: Advanced Functional Materials, Vol. 12, No. 2, pp 89-94 (February 2002), Helmut W. Heuer et al.

SUMMARY OF THE INVENTION

As a result of the Inventors' studies, it was found that when recording layers are stacked in a multilayer configuration by the method described in the second embodiment of Patent document 1 using an electrochromic material, the recording layer which is initially formed is aligned with the concaves and convexes in the substrate, but since the film adheres to the sloping parts of the concaves and convexes, the widths of grooves and pits become progressively narrower regardless of the shapes of substrate imperfections, and the concaves and convexes finally become essentially flat. Hence, if tracking identical to that of an ordinary optical disk is performed on the laminated layers by a tracking groove, a tracking error easily arises due to the deformation of the groove shape.

There is also a method wherein the optical system comprises two individual lasers, a lens or beam expander is inserted in the optical system where one beam becomes parallel before the two beams are combined by a prism, and focusing is performed on a target layer by moving these elements in the optical axis direction, but this leads to a large, costly optical head whose performance deteriorates over time.

It may occur that the positional relationship of the plural beams moves due to head temperature variations. In order to avoid this and perform recording/playback with one beam, a layer to which pits and grooves have been transferred must be provided every several layers so that an address can be read at the displaced focal point. For this purpose, the transfer layer must have a film thickness of 10 microns or more.

It is therefore an object of this invention to resolve these problems by maintaining high compatibility with prior art optical disks while permitting devices to be made more compact, and to realize stable high-capacity, high speed recording.

This invention therefore has the following construction.

As shown in FIG. 3, of two light beams emitted from light irradiation means (light sources) (in FIG. 3, a multibeam laser 21), one or two beams are made to pass through an optical path changeable member 23 (stepped glass plate or the like) immediately after emission from the light irradiation means, whereof at least one of the thickness and refractive index varies continuously or in two or more steps so that a difference is introduced into the optical path length of the two beams, and the optical path length of one beam is made to vary to coincide the focusing point with the position in the recording layer used for playback or recording. In this way, the focal points are made to coincide with a servo layer 30 in which pits and grooves are formed normally, and a layer, e.g., 31, where recording and playback are to be performed.

In Patent documents 5-7, techniques are disclosed where a spherical aberration correction is performed by inserting a stepped glass plate between a multilayer disk head focusing lens and a disk, but these do not use two light irradiation means, and a difference is not introduced into the optical path length of two beams as in this invention. Also, in Patent document 8, a technique is disclosed wherein a first light source is used for focusing control and a second light source is used for tracking control, but there is no mention of introducing a difference into the optical path length of two beams by an optical path changeable member as in this invention.

According to the present invention, light can be converged with higher precision than in the prior art during recording or reading of a multilayer recording medium, so higher density, higher capacity recording/playback can be performed.

DETAILED DESCRIPTION OF THE PREFERRED EMBODIMENTS

Figure 9:
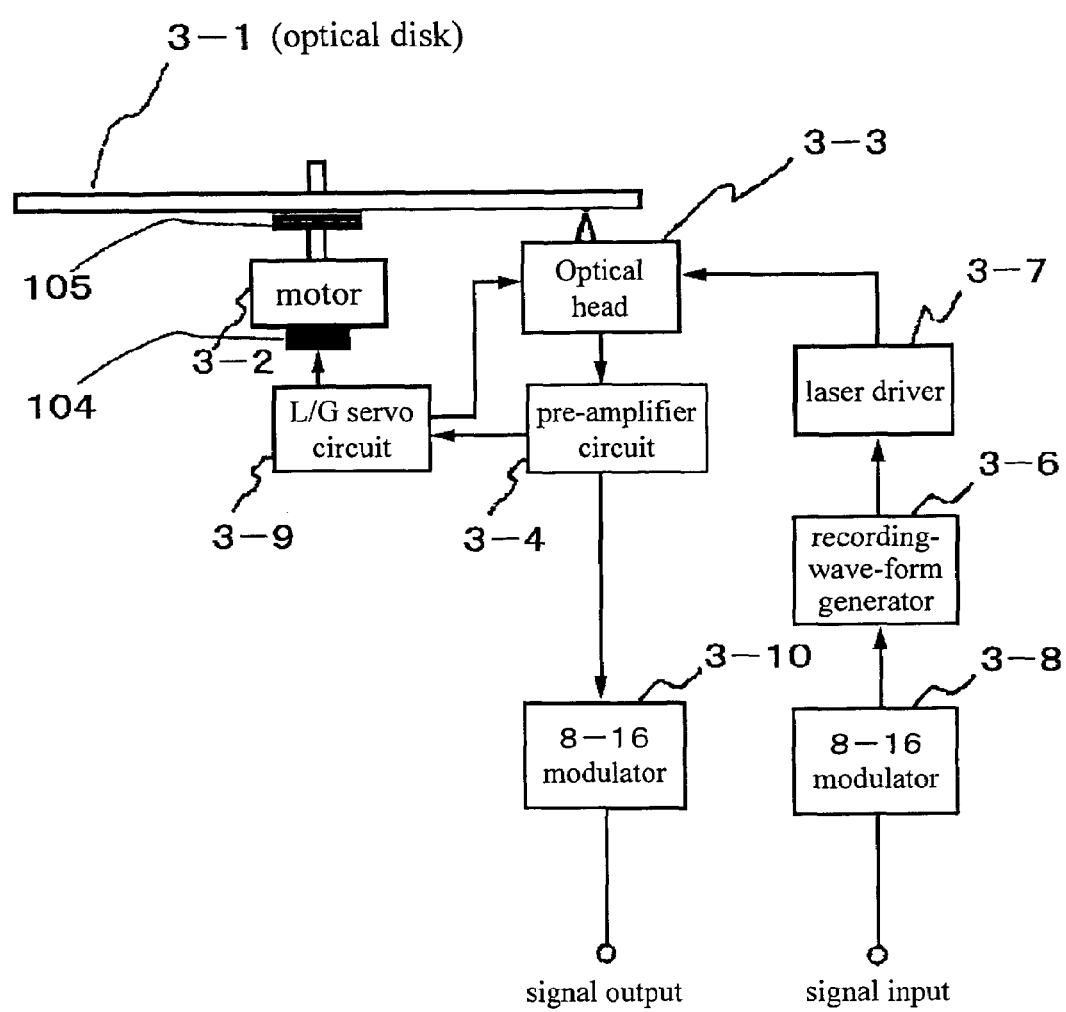
FIG. 9 is a block diagram of a control system according to one aspect of the invention.

Referring to FIG. 9, information recording/playback according to the present invention will now be described. First, the motor control method for recording/playback was the ZCLV (Zoned Constant Linear Velocity) method wherein the disk rotation speed is varied for each zone where recording/playback is performed.

In the present invention, a one chip array laser may be used as the light source for the optical head, but the laser chips of the array laser may also be cut off, and these chips stuck at a distance apart from each other on a silicon substrate. The interval between the light spots is about ⅛ of the beam interval depending on the NA ratio between the collimator lens (NA approx. 0.1) and the focusing (converging) lens. If there are two beams entering one lens, to sufficiently suppress aberration between the two beams, it is particularly preferred that for NA 0.85, the beam interval is 300 microns or less.

The optical head used for recording/playback has the following construction.

Using an array laser which generates at least two laser beams, a glass plate having a staircase-like step is inserted in the optical path of at least one beam before the position where the laser beams overlap with each other after leaving the lasers. The inserted glass plate may be made of another material provided that it is a solid which is transparent to laser light. This staircase-like step corresponds to one period or plural periods of the disk recording layer (electrochromic layer, solid electrolyte layer or surrounding layer), and in the case of a one-period correspondence, the step height is determined so that the focal point is shifted one period at a time.

$$t=(fc/f0)^2 \cdot (n1/(n1-1)) \cdot (1/n2) \cdot \Delta d$$

In the above equation,
t is the thickness of the inserted glass plate
n1 is the refractive index of the inserted glass plate
Δd is the film thickness per layer (focal point offset amount)
n2 is the average refractive index of one layer
fc is the focal distance of the collimator lens (here, 16 mm)
f0 is the focal distance of the objective lens (here, 2.31 mm)

If the plural layers lie within the focal depth of the focusing lens, they are made to correspond to the same step. t need not be the precise value given by the aforesaid equation, and may be close thereto (error±20%). The thickness through which the beam passes is not necessarily staircase-like, and may vary smoothly. In other words, the thickness or refractive index may only vary in a range. At least one laser beam is made to pass through a part having a different thickness or refractive index to another laser beam, and if a servo is applied so that one laser beam is always focused on the servo layer which has concaves and convexes such as address information, the focal point of the other beam will be on another layer. The aforesaid stepped glass plate is driven so that the thickness difference varies, and the focal point of the other beam is on a determined layer where recording or reading is performed.

Figure 8:
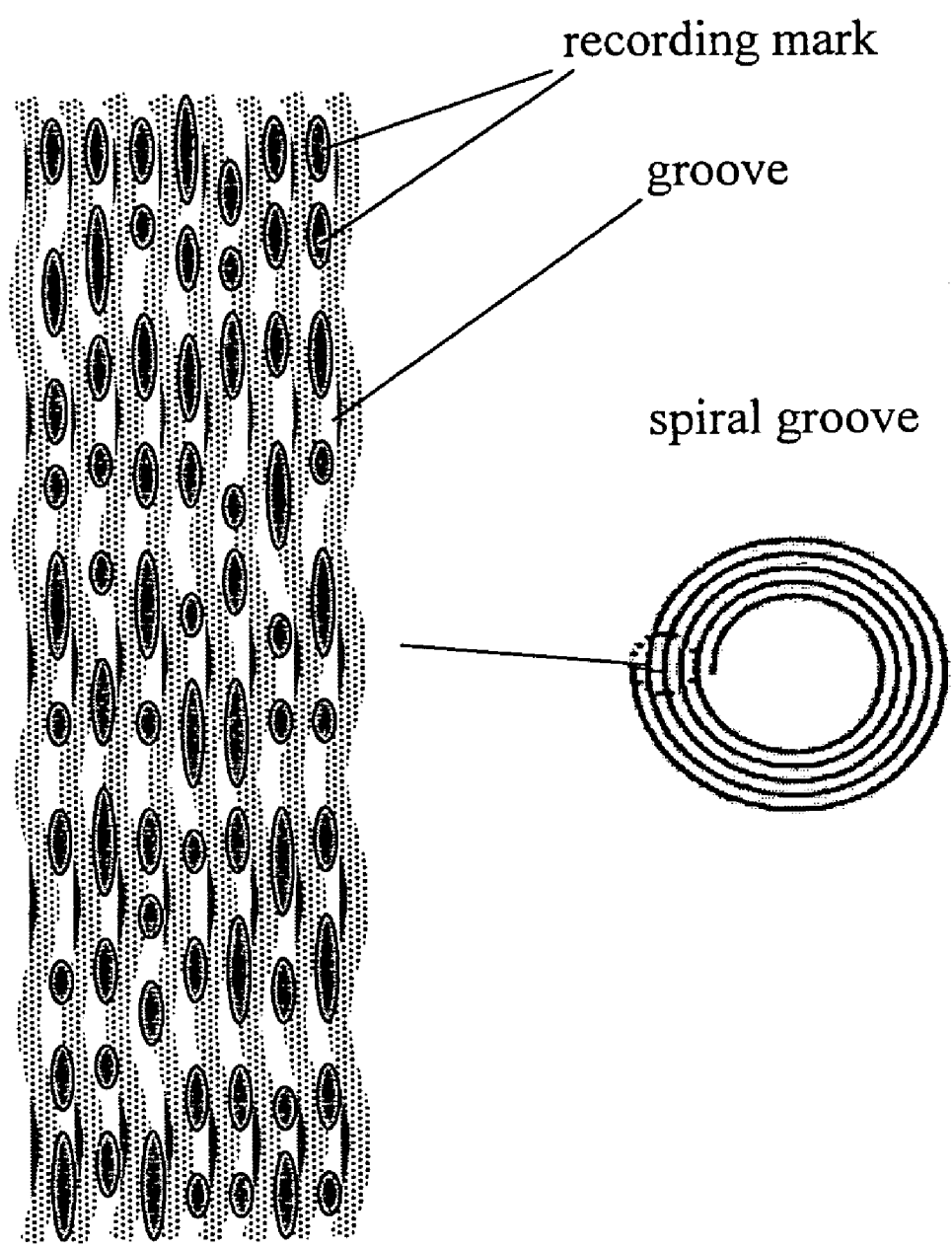
FIG. 8 is a diagram showing the surface shape and recording state of grooves according to one aspect of the invention.

Recording on the recording medium is performed with the positional relationship shown in FIG. 8 relative to the grooves of the servo layer. As the concaves and convexes are smooth, write is need not be performed in the lands within grooves or between grooves, and may be performed on one or both of the left sloping surface and right sloping surface of the sloping parts of the grooves. This makes it easy to detect beam position offsets in the radial direction of the recording/playback layer.

Instead of using an array laser, plural lasers, for example two lasers, may also be used. In this case, the beams from the two lasers are aligned in the same direction by a prism in the same way as in the two-laser optical system known in the art, but a stepped glass plate is inserted in the optical path of one beam at a position before the beams from the two lasers overlap with each other. However, in this case, the adjustment of the relative position of the beams is delicate, and may be offset by temperature or vibration.

To vary the thickness of the glass, i.e., to move the laser beam to a step of different height in the stepped glass plate, the staircase-like glass plate can be moved in a straight line, but it may also be rotated, or a spiral-shaped glass plate (e.g., a circular glass plate having quadrants of respectively different thicknesses) may be rotated instead. Alternatively, electrodes may be attached to a plate of material wherein at least one of the thickness and refractive index are varied by a voltage. In this case, the voltage can be varied in stepwise fashion or continuously instead of using a stepped glass plate with plural steps. If the servo beam is also made to pass through it, a voltage can be applied to this part, or a different voltage can be applied to the part where the recording/playback beam passes through it. The material used may for example be a transparent piezoelectric material.

A transparent tape of gradually varying thickness may also be moved linearly. A focusing servo is always applied to the servo beam, so when the thickness of the stepped glass plate through which the recording/playback beam passes is changed, if the relative thickness difference is always arranged to be a predetermined value, the thickness of the part through which the servo beam passes and other beam passes can be made to vary simultaneously, but the servo may become unstable.

If at least two laser beams are effectively parallel, and there are areas which are parallel to each other, the interval therebetween is preferably 100 microns-300 microns. If the interval is wider than this, when the two beams pass through the focusing lens to the disk, it is no longer possible to converge them with a practically small aberration. If the interval is narrower than this, it is difficult for the beams to pass through mutually different steps of the stepped glass plate.

Hence, in general, the information recording and/or playback device wherein an information recording medium is irradiated by light to perform information recording and/or playback, should comprise single or plural laser light sources which generate at least two laser beams. The device should comprise a transparent material having a distributed thickness or refractive index which is inserted in the optical path of at least one laser beam before the beams overlap with each other after leaving the lasers, so that at least one servo laser beam passes through a part having a different thickness or refractive index from the other laser beam. It may also occur that the part through which the servo laser beam passes has zero thickness, i.e., that the beam is transmitted without modification.

The range before the beams mutually overlap with each other is the beam-diverging range and lies within the distance up to the point where the beams are made parallel by the collimator lens after being emitted from the lasers, and within this distance, the distance up to the point before the beams pass through the prism is preferred. A parallel beam is a light beam that does not broaden as it progresses, and the outer contour of the region with $1/e^2$ intensity is effectively parallel (cylindrical).

When lasers which generate effectively parallel plural laser beams from plural generating sources are effectively disposed on the same straight line, i.e. an array laser, is used, the beams are always emitted parallel at a fixed interval so adjustment of the optical system is easy, which is preferred.

If at least a means is provided to drive the aforesaid transparent material effectively perpendicular to the optical axis so that the thickness or refractive index of the part through which the aforesaid other laser beam passes, varies, a multilayer recording medium can be used, which is preferred.

However, if the number of laser beams is one more than the number of layers, there is no need to move the transparent material where thicknesses or refractive indices of the parts through which the beams pass is different with respect to the beams.

One of the following methods may be used to vary the thickness or refractive index by moving the aforesaid transparent material effectively perpendicular to the optical axis:

1. A staircase-like transparent material is moved in a straight line or rotated to vary the thickness or the refractive index.
2. A spiral staircase-like transparent material is rotated to vary the thickness.
3. A voltage is applied in the light transmission direction (using transparent electrodes) or in a direction at an angle thereto, to a transparent material wherein the thickness or refractive index, or both, can be varied by applying a voltage.
4. A transparent tape whereof the thickness gradually varies is moved in a straight line.

One of the steps does not necessarily correspond to one recording layer, and if the gap between layers is narrow, plural layers may be made to correspond to one step.

If plural staircase-like or spiral staircase-like transparent materials are inserted in the optical path and these are driven independently, the beams can be focused on a recording medium comprising plural layers without any limitation imposed on the machining of the staircase-like transparent material.

If plural staircase-like or spiral staircase-like transparent materials are inserted in the optical path, and there is a transparent material with a relatively large step and a transparent material with a relatively small step therein, step corrections can be made according to their thickness or combination, and one information recording and/or playback device can be made compatible with plural types of multilayer media.

Figure 4:
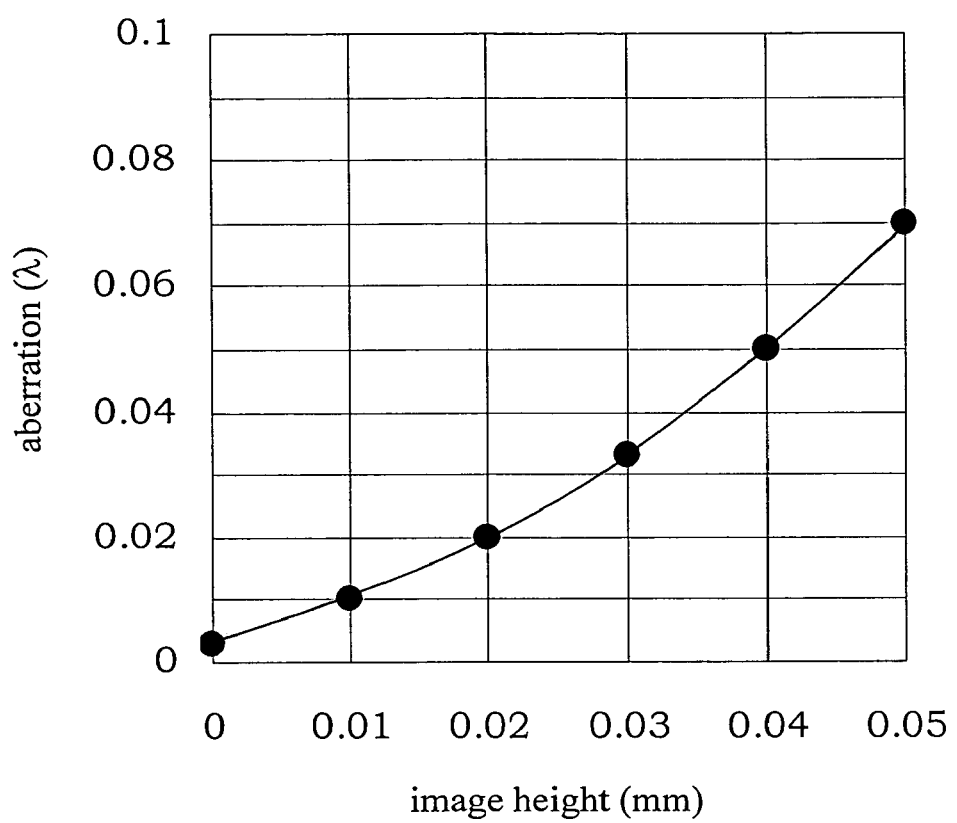
FIG. 4 is a diagram showing a relation between image height and wave front aberration taking the optical head of the invention as an example.

Further, if at least two laser beams are two effectively parallel beams, there are regions which are parallel to each other and the interval between optical axes (beam centre axes) is 100 microns to 300 microns, as can be seen from the value of the vertical axis λ rms in FIG. 4, both beams can be converged with an aberration which is within tolerance, and sufficient tolerance can still be obtained if the steps of the aforesaid staircase-like transparent material cannot be machined precisely vertical, which is preferred. A more preferred range is 150 microns to 250 microns. The individual high power lasers used for an ordinary one beam optical head are also manufactured by separating bar-like laser array. The interval between bar-like lasers is often of the order of 200 microns, and if several are cut off together e.g., two laser-array, and mounted on a stem, they may be used as the optical head of the present invention.

The recording medium comprises a substrate or a cover layer which has pits or grooves capable of tracking, and for layers where the focusing error signal cannot be separated from the focusing error signal of the reflected light from the servo layer, the optical depth of at least some pits or grooves should be shallow. It is preferred to use a servo system which focuses each beam on a predetermined layer by recognizing this fact. The pits or grooves need not be physical depressions or grooves, and may be optical pits or grooves produced by refractive index variations.

Figure 1:
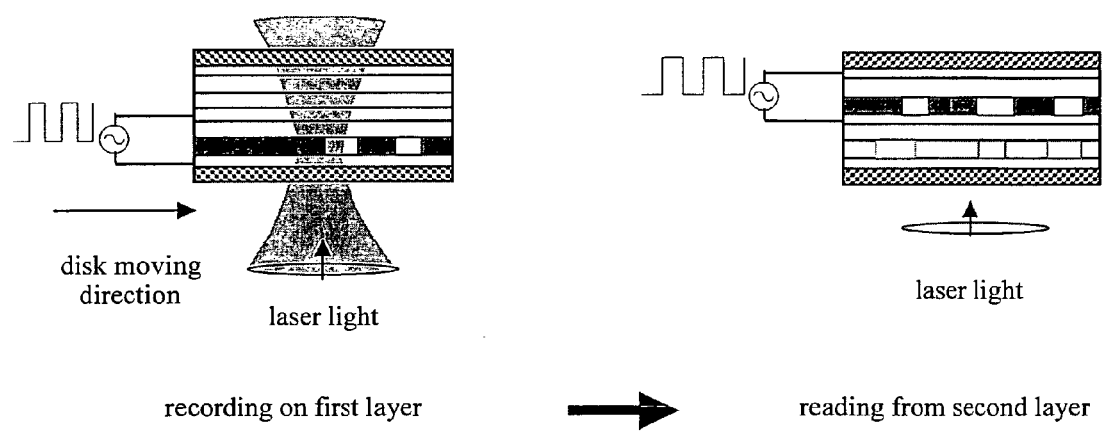
FIG. 1 is a diagram showing the principle of preventing crosstalk between layers in a recording and/or playback device according to the present invention.
Figure 2:
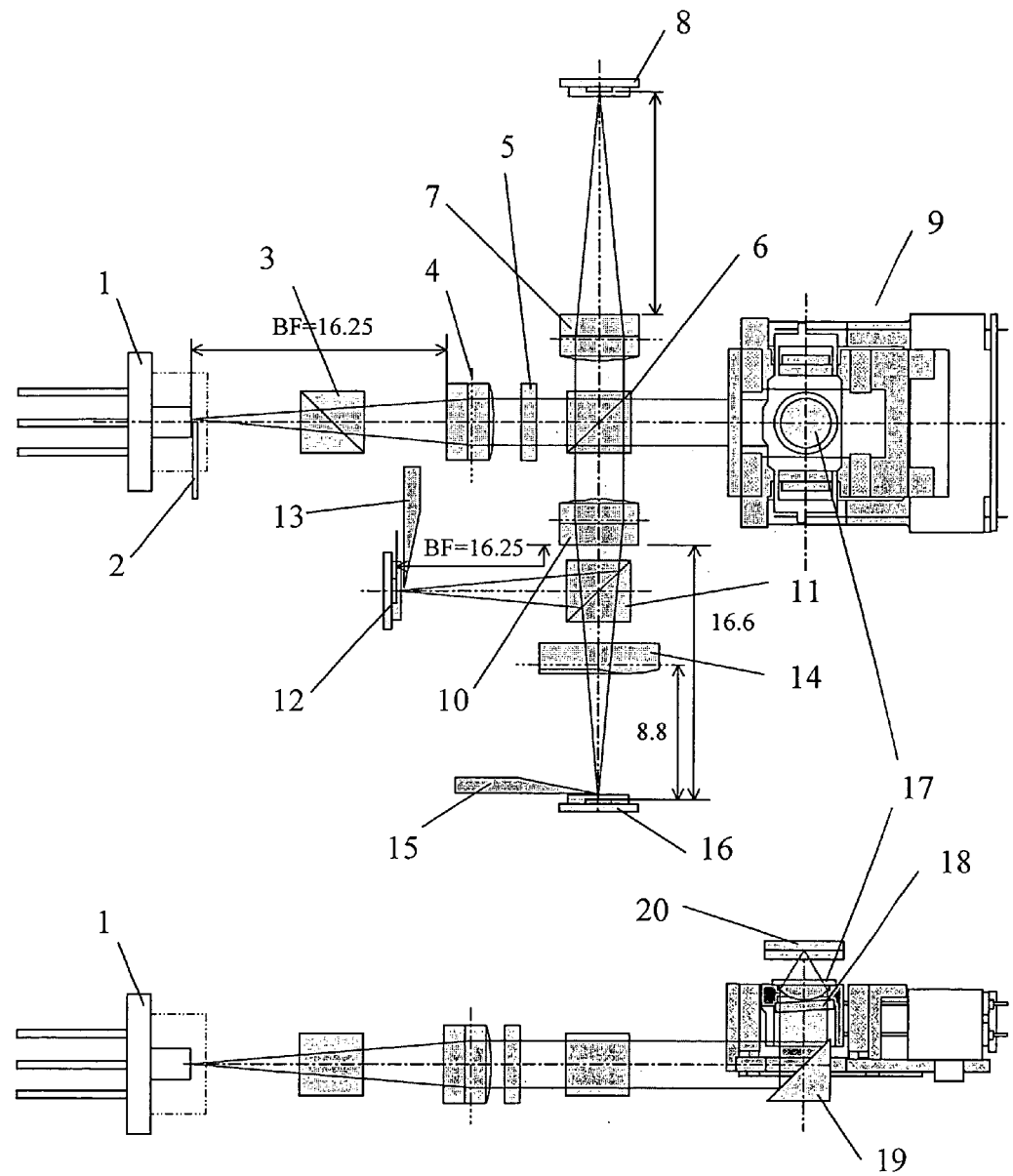
FIG. 2 is an example of an optical system of an optical head according to the invention.
Figure 12:
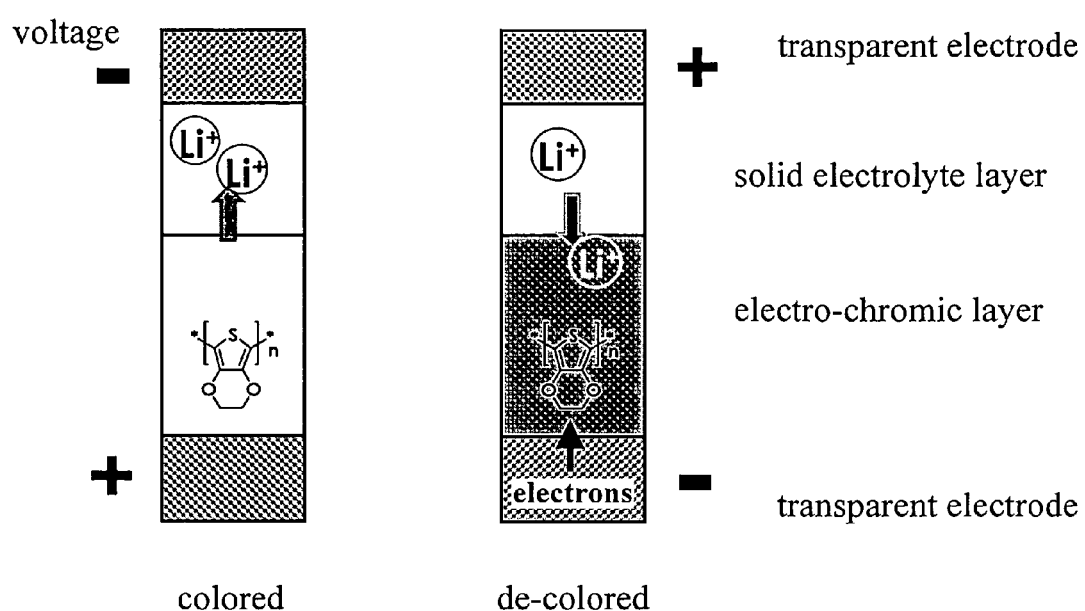
FIG. 12 is a diagram showing coloration/decoloration of an electrochromic layer according to one aspect of the invention.

Preferably, the aforesaid information recording medium is a multilayer recording medium which comprises at least an electrochromic layer and an electrode layer which can apply a voltage to the electrochromic layer, and also comprises at least a means to apply this voltage to the electrode layer. This will now be described in detail. Basically, each recording layer is transparent. As shown in FIG. 1, only the layer to which a positive voltage is applied between the electrodes enclosing the recording layer, is colored. FIG. 12 shows the details of this coloration. If a recording mark is formed where the coloration function is lost or becomes weaker so the coloration is delayed due to the recording laser light irradiation, the recording mark cannot be seen when the whole layer has been made transparent again, so it does not interfere with recording/playback of other layers. Therefore, as there is no interference with other layers the inter-layer interval can be made narrower, and more layers/higher capacity can be achieved than in a prior art multilayer disk. The recording layer may be a laminated film comprising an organic or inorganic electrochromic material layer and solid electrolyte layer whereof the light absorption spectrum changes when a voltage is applied, or it may be a mixed material layer or laminated film comprising an electroluminescent material and photochromic material. In this way, the light absorption and reflection in any desired layer can be increased, while other layers have practically no light absorption. In a multilayer laminate, the pits or grooves representing address information are deformed, but in some cases, by providing a thin layer to which pits or grooves are transferred every specific layer or laminate, it is ensured that the address can be read for at least some layers within the focal depth at a displaced focal point. The electrochromic material may for example be tungsten oxide, and the solid electrolyte material may for example be tantalum oxide. The layers between these transparent electrodes are generally referred to as the recording layer. Recording may be performed by a variation in any part in the thickness direction of the recording layer. If there are plural electrochromic material layers between the pair of transparent electrodes, recording may also be performed separately on each layer.

The material of the transparent electrode may a transparent electrode material known in the art having the composition $(In_2O_3)x(SnO_2)1-x$ where x is 5-9%, but from the viewpoint of resistance value, it is more preferred that x is 90 to 98%, with the addition of 50% or less of $SiO_2$ in terms of mole percent. Alternatively, 2-5% in terms of mole percent of another oxide such as $Sb_2O_3$ may be added to $SnO_2$, it may have zinc oxide as its main component, or it may employ an electroconducting organic material such as polythiophene or polyacetylene.

According to this embodiment, a polycarbonate substrate 77 having tracking grooves is directly used for the surface, the substrate having tracking grooves of depth $\lambda/15n$ (n is the refractive index of the substrate material), on all or part of the substrate surface when the recording/playback wavelength is $\lambda$. The groove may be continuously formed over the whole circumference, or split in the middle. The substrate thickness is within the range 0.05 mm to 1.2 mm. This groove width may vary depending on the location. The substrate may have a format such that recording/playback can be performed on both the grooves and the lands, or a format such that recording is performed on only one thereof. In the type where recording is performed only in the grooves, the track pitch is preferably in the vicinity of 0.7 times the NA of the wavelength/focusing lens, and the groove width is preferably ½ of that. As mentioned already, in the case of a sample servo system, a substrate with a sample servo format is used.

The aforesaid information recording medium is preferably a multilayer recording medium wherein the interval from centre to centre of at least two recording layers is 100 nm to 1000 nm (1 micron). If the interval between the recording layers is smaller than this, the recorded state of neighboring layers varies due to thermal conduction between recording layers during recording. If the interval between the recording layers is larger than this, it is difficult to suppress aberration.

In the present application, the electrochromic material layer or recording layer may not only be a layer of material which is directly colored (absorption spectrum varies) due to the application of a voltage (current flows), but may also be a layer having a region which emits light, and a region which colors or decolors when it receives light due the application of a voltage. The electrochromic layer itself may also have the functions of a photoconductor, layer, and its coloration or decoloration properties may vary due to phase change.

Figure 6:
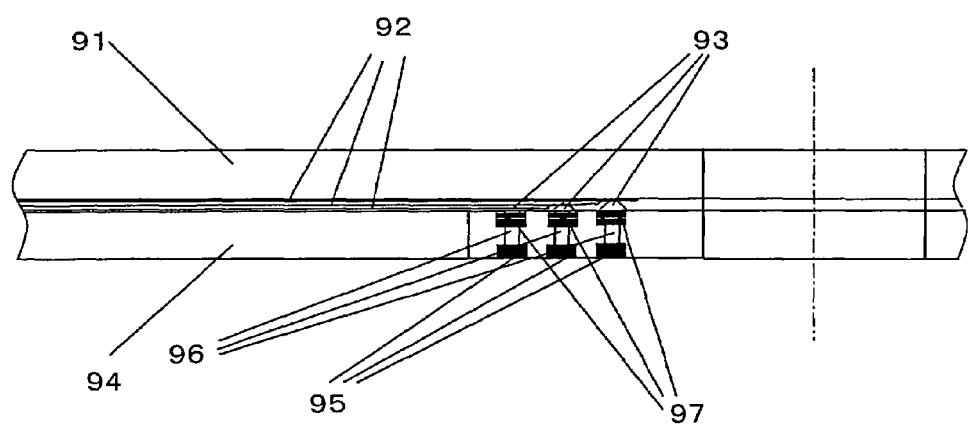
FIG. 6 is a diagram showing the overall cross-sectional structure of a disk according to one aspect of the invention.

As shown in FIG. 6, when each layer is formed, the inner circumferential mask becomes slightly larger so that each electrode is concentrically exposed by the inner circumferential part. In the figure, for simplicity only two layers are shown, but in reality the number of layers is larger. The inner circumferential part of the bonding substrate is a separate substrate. This substrate is like a printed circuit wherein concentric metal electrodes corresponding to the number of transparent electrodes are formed on both surfaces, and metal pins (thin metal cylinders or metal wires) penetrate the substrate so as to connect corresponding concentric electrodes on the top surface and bottom surface. Normally, in the case of a printed circuit, on the bonding side of the substrate which has the recording layer, the top surface metal interconnections are solder-plated, but this may lead to imperfections so it is better not to perform solder plating. An In layer may also be formed. In, which was used for crimping the face plate of a camera tube, has a low melting point and is pliable, so when it is pressed against the substrate with the recording layer, it deforms and sticks to the transparent electrodes. Instead of In, an organic material which has conductivity and elasticity such as a commercial conductive double-sided tape, or a combination of a conductive rubber and conductive adhesive may be used, the conductive adhesive being a composite material comprising an organic material and a metal. The inner circumferential substrate and outer circumferential substrate having a recording and/or playback region may be formed in a one-piece construction, the two substrates may be bonded together, or they may be individually bonded to separate substrates.

Figure 7:
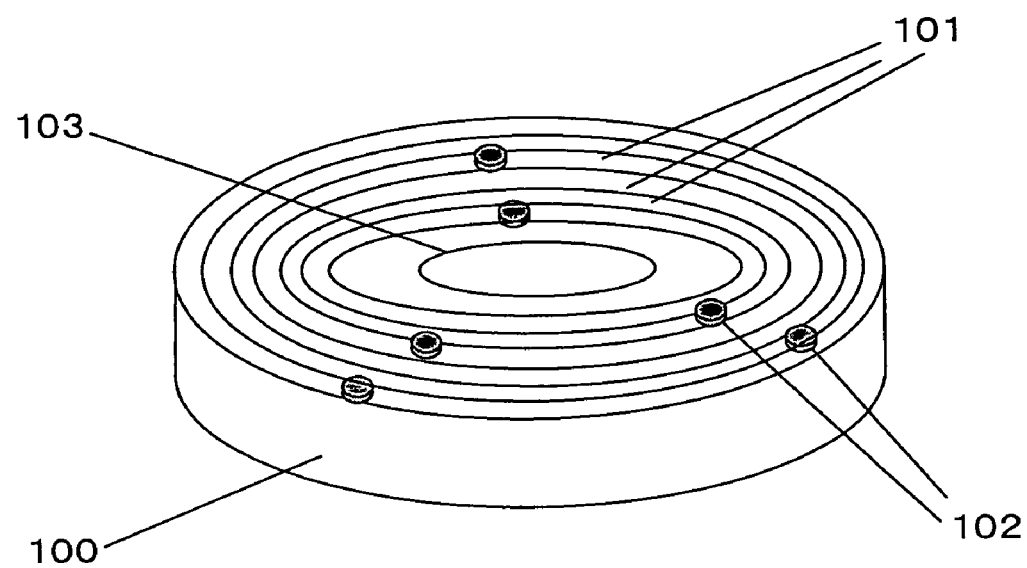
FIG. 7 is a diagram showing the position of a pin electrode of a disk sustainer according to one aspect of the invention.

In the upper part of the disk sustainer situated at the top of the rotation axis of the disk motor, as shown in FIG. 7, there are three pin electrodes for each concentric electrode which comprise a spring in contact with the concentric electrodes on the top surface of the inner circumferential substrate of the disk, and when the disk is placed in position, a current can be passed through each electrode. In FIG. 7, for simplicity, only the pin electrodes corresponding to three concentric electrodes have been drawn. The pin electrodes may be cylindrical. The inner circumferential substrate and the outer circumferential bonding substrate may be formed in a one-piece construction.

Figure 11:
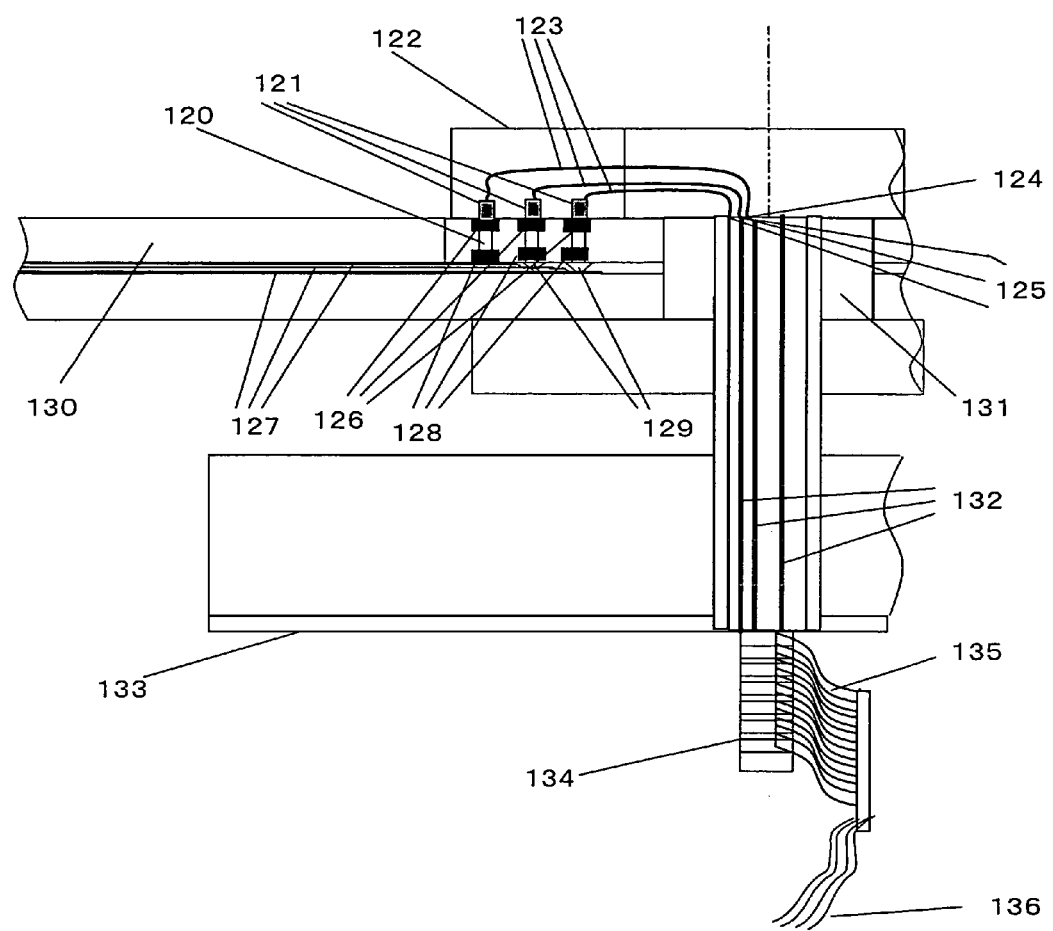
FIG. 11 is a diagram showing a voltage application method via a clamp according to one aspect of the invention.

Six separate wires, which pass close to the top surface of the inner part of the disk motor rotation axis connected to the disk sustainer (circular plate) corresponding to a multilayer disk of up to 5 layers, are connected to a disk sustainer electrode. Each wire is connected to three of the above concentric pin electrodes. These disk rotation axis wires, as shown in FIG. 11, are supplied with power from a rotation substrate of the recording device by a voltage transfer mechanism which comprises plural brushes and rings. The interconnection from each ring runs upward inside the rotation axis towards the disk sustainer. In the case of these brushes and rings, there is one ball at the tip of each brush, and if a conductive lubricant material is used around the ball, wear can be suppressed and lifetime can be extended. The brushes may be provided independently for each electrode, but here six have been brought together to form a spring plate. If they are brought together in this way, there is no mutual interference and stable operation can be achieved even if there are about 50 electrodes. Instead of the brush and ring combinations, ball bearings may also be used. The ball bearings are filled with a conductive grease containing carbon fines to improve electrical conductivity. The voltage transfer mechanism (power supply method) may be a combination of a laser or LED and a solar cell, or it may be another method such as a non-contact type which generates power due to the relative motion of a magnetic coil. The voltage transfer mechanism may be situated on the disk side or on the opposite side of the disk rotation motor.

In the case of laser light irradiation from the substrate side, a transparent reflective layer comprising plural films is preferably used as described above. If laser sources of different wavelength are used as the two laser beam sources, the transparent reflective layer is preferably designed such that one laser beam (e.g., wavelength 660 nm) which is the servo beam is reflected, and the other laser beam is transmitted.

First, during control, all layers are decolorized, and the focusing error signal of the servo layer which focuses the servo beam is entered in a memory. Next, a desired layer is colored, the variation in the focusing error signal is learned, and at least one laser beam is auto-focused onto the servo layer even if there is a colored layer.

If the information expressed by the imperfections in the servo layer which focuses the aforesaid servo beam is a signal such as for example a moving image, which has significance for a ROM optical disk, another layer can be recorded, so a ROM/RAM mixture or ROM/R mixture can be realized depending on the layers to broaden the extent of application.

For example, when a disk is set in the device, if control is performed so that the servo beam and another beam pass through parts of the aforesaid transparent substance having identical thicknesses and identical refractive indices at a predetermined timing, e.g., 30 minutes, or when the internal temperature of the device changes by 5° C., or when they are made to pass after completely removing the aforesaid transparent substance, the focal point of both beams can be placed on the servo layer, so track address information or sector address information can be read from the servo layer by these beams, and the absolute position or relative position of the beam spots can be verified, which is preferred.

Preferably, a procedure is provided to, at a predetermined timing, detect from at least one of the modulation degree, asymmetry and edge shift of the playback signal of the imperfections which follows at least some of the imperfections of the servo layer situated underneath a predetermined layer, whether or not the aforesaid other beam is precisely focused on the predetermined layer and change the focusing offset, or a means to correct the focal point by repeating the procedure.

A procedure is preferably also provided to, at a predetermined timing, perform a trial write of a predetermined recording/playback layer with the aforesaid other beam, detect from at least one of the modulation degree, asymmetry and edge shift of the playback signal of this part which follows at least some of the imperfections of the servo layer situated underneath a predetermined layer, whether or not the aforesaid other beam is precisely focused on the predetermined layer and change the focusing offset, or a means to correct the focal point by repeating the procedure. If the trial write at least partially includes a trial write for matching the recording laser waveform or power level, the time can be shortened which is preferred. If a recording medium is used wherein a difference is introduced into the address of each layer by adding address information with a recording mark, the address can be read and verified also by the recording/playback beam, and if it is offset, the head is rotated to adjust it.

At least one of the modulation degree, asymmetry and edge shift of the playback signal is subject to the effect of focusing error, so if the focusing offset is progressively varied and the change when there is a discrepancy from the state where the optimum playback signal is obtained is learnt, an optimum focusing according to the type of recording medium can be performed.

The present invention is effective for the recording density (track pitch, bit pitch) of the 2.6 GB DVD-RAM specification or higher, and is particularly effective for the recording density of the 4.7 GB DVD-RAM specification or higher. If the wavelength of the light source is not in the vicinity of 660 nm, or the aperture (NA) of the converging lens is not 0.6, it is effective for a recording density converted therefrom by a wavelength ratio and NA ratio in both the radial direction and circumferential direction, or higher.

According to the present invention, "phase change" includes not only a phase change between crystalline and noncrystalline, but also between molten (change to liquid phase) and recrystallization, and crystalline-crystalline. The meaning of the expression that the electrochromic material of the present invention has electrical conductivity is that, when a voltage of 2V is applied between the first and second electrodes of a disk having a diameter of 80 mm or more, a steady current of 0.1 mA or more flows.

Figure 18:
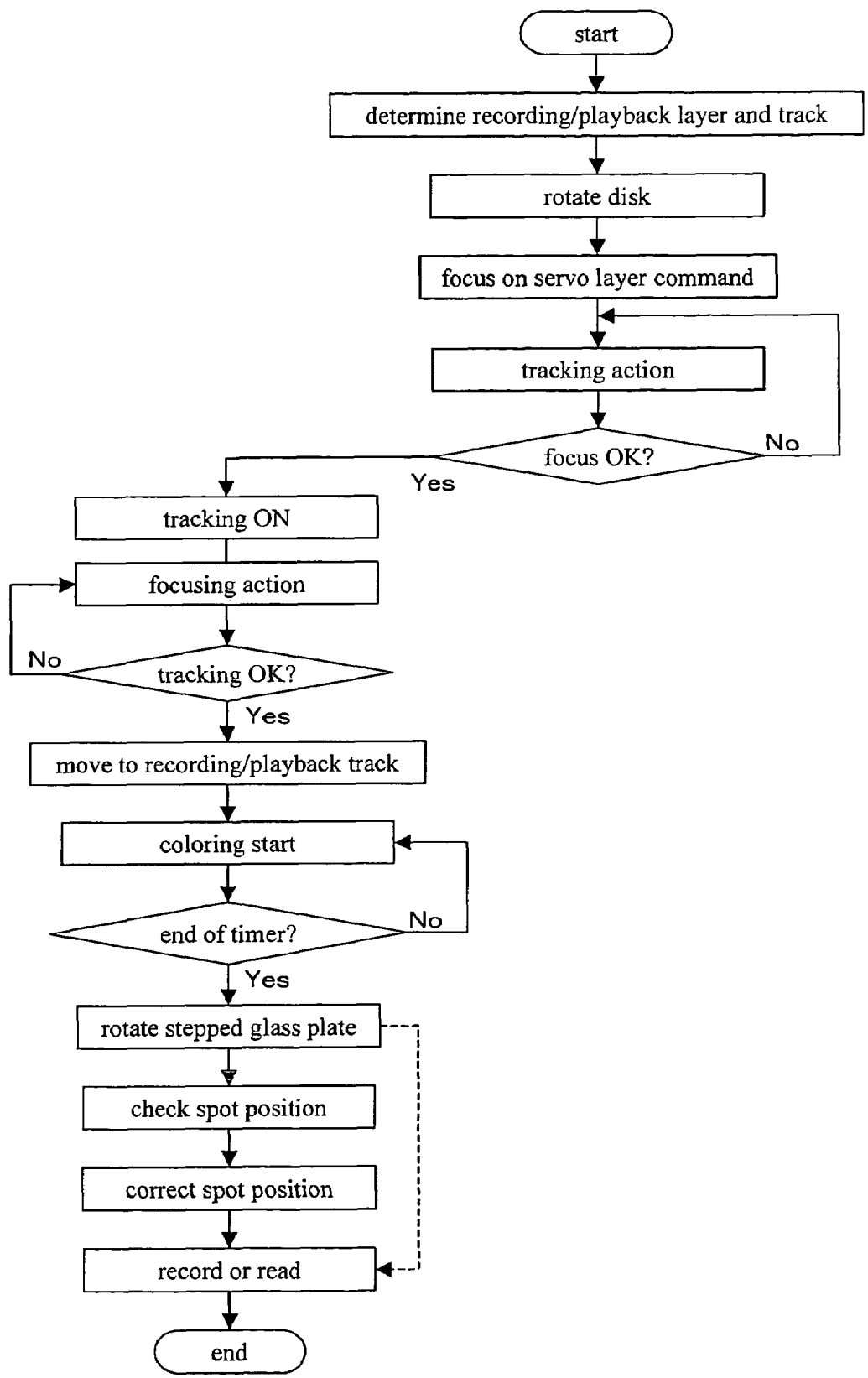
FIG. 18 is a flow chart of recording/playback according to one aspect of the invention.

Recording or playback, as shown by the flowchart of FIG. 18, may for example be performed as follows. First, the layer number of the layer on which recording or playback is to be performed and the track number are determined, the disk is rotated, the servo beam is autofocused on the substrate surface or on the servo layer which is close thereto, and a tracking servo is then applied. Also, the beam is moved to a predetermined track. Next, a coloration voltage is applied to this layer to start coloration. Next, the stepped glass plate is rotated or moved parallel if required so that the recording/playback beam passes through a step corresponding to a difference in position in a perpendicular direction to the substrate surface between the servo layer and layer on which recording/playback is to be performed. Due to this, the recording/playback beam is converged on a predetermined track of a predetermined layer and should start tracking, so the tracking error signal is monitored as well as the address in the case of a layer where this is possible, and track jump, and/or fine adjustments to the angle of the optical head, are performed if required. Subsequently, the actual recording or playback operation is performed.

When the recording/playback operation is complete, and the next layer on which recording/playback is to be performed is a different layer, a decoloration voltage is applied to the recording/playback layer, the track is moved to a new recording/playback track, and a coloration voltage is applied to the new recording/playback layer. Next, the stepped glass plate is rotated or moved parallel to change the layer on which the recording/playback beam is focused. Subsequently, recording or playback is performed in the same way.

Figure 3:
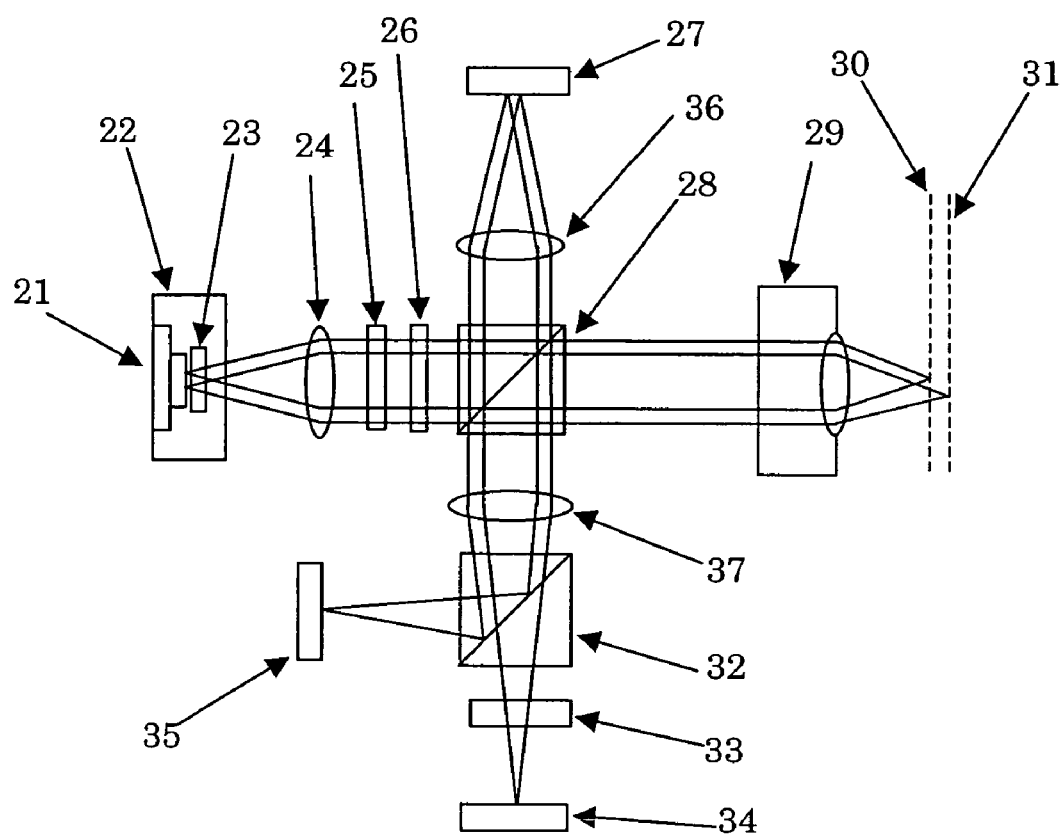
FIG. 3 is a diagram showing another example of an optical system of an optical head according to the invention.

Specifically, as shown in FIG. 3, two beams are emitted from the multibeam laser 21. A stepped glass plate 23 is inserted before these two beams come together. This is positioned at a position where only the Read/Write beam can pass through a variable thickness part of the stepped glass plate. 23 is rotated or moved in a straight line by an actuator 22 (a very small motor such as for example a rotating cylinder), for example a stepping motor or linear motor. The respective light beams become parallel beams due to the collimator lens 24. Due to a beam splitter 28 comprising a ½ wave plate 26, 80% of the light is transmitted and 20% is reflected. The reflected beam is brought to an image in a split detector pattern 27, and these respective beam outputs are controlled. The transmitted beam is brought to an image on the disk by a two-dimensional actuator 29. Light which has not passed through the stepped glass plate 23 is brought to an image on the servo layer, and light which has passed through the stepped glass plate is brought to an image on the recording layer selected for recording/playback. When the glass thickness changes due to the very small motor 22, the light is brought to an image on another layer. The light reflected from the disk is reflected by the beam splitter 28, the Read/Write beam is reflected by a beam splitter 32, and the light is detected by a detector 35.

The servo beam passes through 32, and passes through a cylindrical lens 33. Autofocus control uses the astigmatic method, and tracking control uses the three spot method by means of a grating 25.

When this device is used to play back a multilayer ROM disk or a prior art recordable Blu-ray disk, or to record/playback a recordable DVD disk, recording/playback/interlayer jumps are performed as in a prior art optical disk device using only the servo beam or recording/playback beam.

Figure 13:
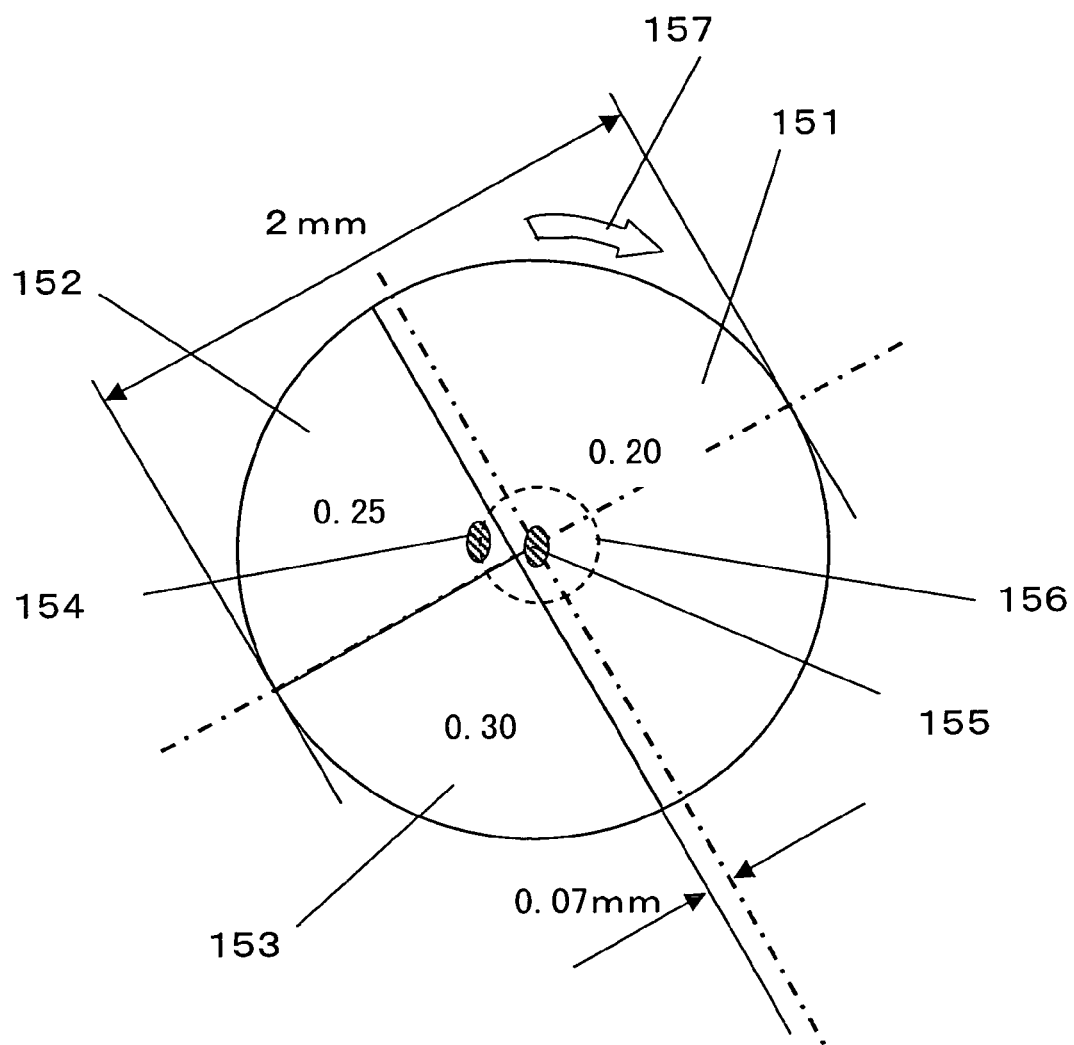
FIG. 13 is a structural diagram of a spiral staircase-like stepped glass plate according to one aspect of the invention.
Figure 14:
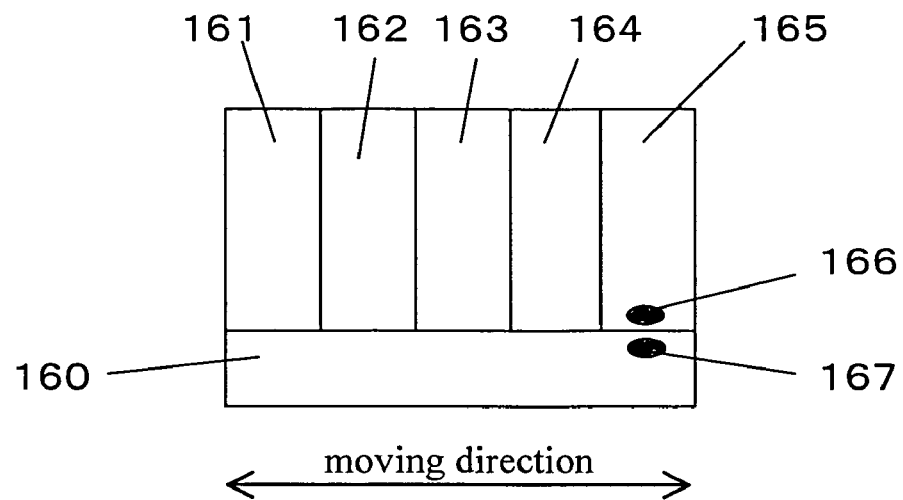
FIG. 14 is a structural diagram of a straight staircase-like stepped glass plate according to one aspect of the invention.

It is very difficult to machine and polish the staircase-like or spiral staircase-like stepped glass plate (abbreviated as stepped glass plate or stepped plate) is machined and polished, and to finish the corners of the upward-facing part of the steps. Hence, it is preferred to flat polish a thin quartz-glass plate to a thickness of three 0.05 mm steps, e.g., 0.05 mm, 0.10 mm and 0.15 mm, cut it and stick it like a staircase to a base plate having a thickness of about 0.2 mm using an adhesive. To prevent adhesive from oozing into the upward-facing part of the steps, a sheet of thickness 0.05 mm was also stuck to the thinnest part of the stepped plate. In this way, adhesive was absorbed by the perpendicular projecting surfaces where sheets came into contact, and oozing of adhesive was prevented. FIG. 13 shows the structure of a spiral staircase-like stepped glass plate with three steps. The projecting surfaces of a semicircular sheet and another sheet are offset by 0.07 mm from the centre of a circle which is also the rotation centre. Due to this, the servo beam always passes through a part of thickness 0.25 mm in the centre of the circle. The size of the steps will vary depending on the thickness of one layer of the recording medium, and the refractive index of the recording film material. In this case, the thickness is obtained by multiplying the thickness of each step by a certain factor. FIG. 14 shows the shape of a linear staircase-like stepped glass plate.

In this case also, for each of the 5 steps, the long, thin step part through which one beam passes was separately manufactured and polished, and stuck to a thin base sheet. All the stepped glass plates were finally given an anti-glare coating. If one satisfactory stepped glass plate can be manufactured, a mold can be made therefrom, and plural plates can then be manufactured by compression or injection molding of glass. After molding, the corner parts of the steps should machined to perfect right angles by additional processing.

The plate is not necessarily stepped, and may take another form provided that it is an optical path changeable member which can vary the optical path length, e.g., a stepped glass plate (optical path adjusting plate) having a step or gradient in the refractive index may also be used. As an example, quartz ($SiO_2$), alumina and zinc sulfide (ZnS) plates were all optically polished to an identical thickness of 0.25 mm, and adjacent plates were stuck together to form a rectangular parallelepiped type stepped glass plate.

Figure 10:
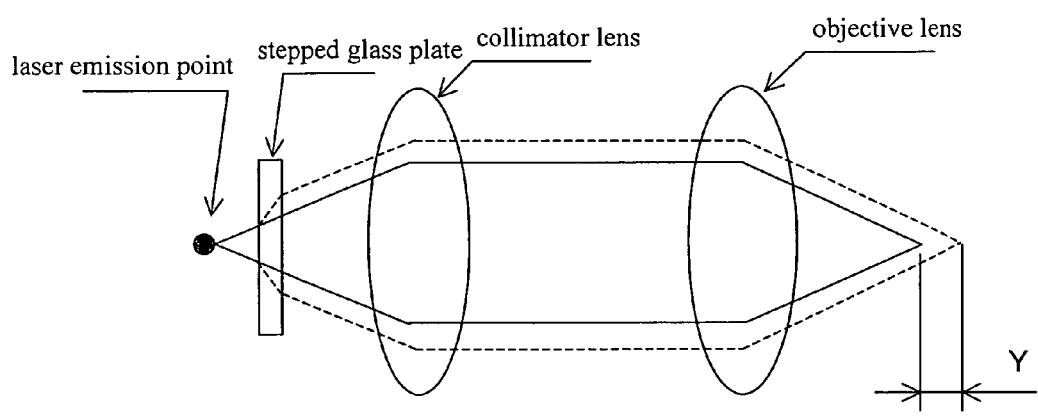
FIG. 10 is a detailed diagram of an optical system according to one aspect of the invention.

FIG. 10 shows the principle whereby the focal point is shifted by an optical path adjusting plate of the aforesaid type having different refractive indices. The aforesaid stepped glass plate may also be heat-treated to cause counter diffusion of the boundary parts so as to form an optical path adjusting plate wherein the refractive index varies gradually.

Figure 15:
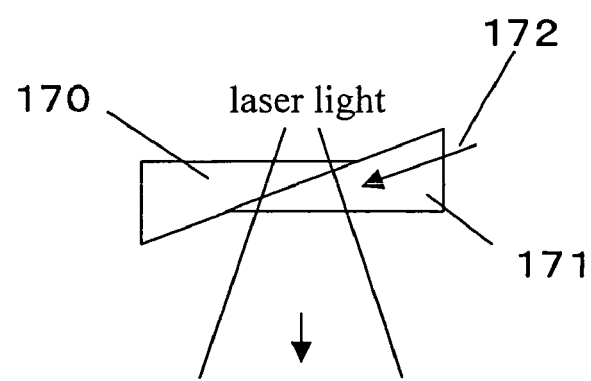
FIG. 15 is a structural diagram of combined triangular glass plates according to one aspect of the invention.

In order to make the level difference continuously variable so that it is compatible with various types of recording media, a Babinet-Jamin-step shaped plate which comprises plates of triangular cross-section stuck together, is preferred. As shown in FIG. 15, if triangles are made to slide along a slope to vary the overlapping part, the thickness in the up/down direction of the figure can be continuously varied. However, in this case, when the overlap is reduced, the parts which do not overlap project upwards and downwards, so care must be taken as regards the spatial relationship between the stepped glass plate and other optical components such as lasers.

Figure 16:
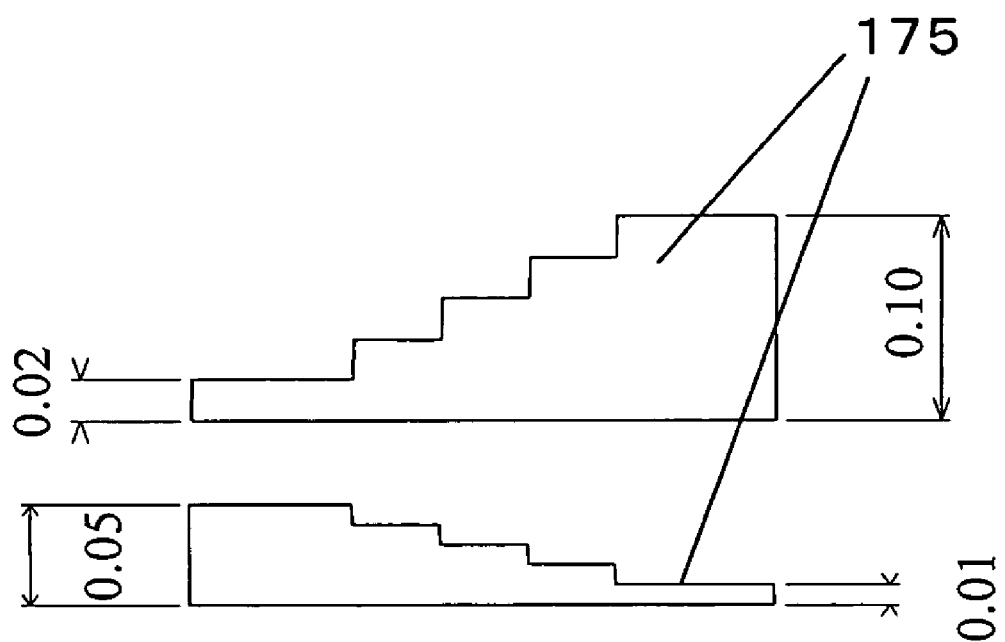
FIG. 16 is a structural diagram of combined stepped glass plates with different steps according to one aspect of the invention.

Another method of complying with plural types of recording media, as shown in FIG. 16, is to make one beam pass through a stepped glass plate with large steps and a stepped glass plate with small steps. The layer is selected by the plate with large steps, and differences such as film thickness per layer between media are corrected by the plate with small steps.

Figure 17:
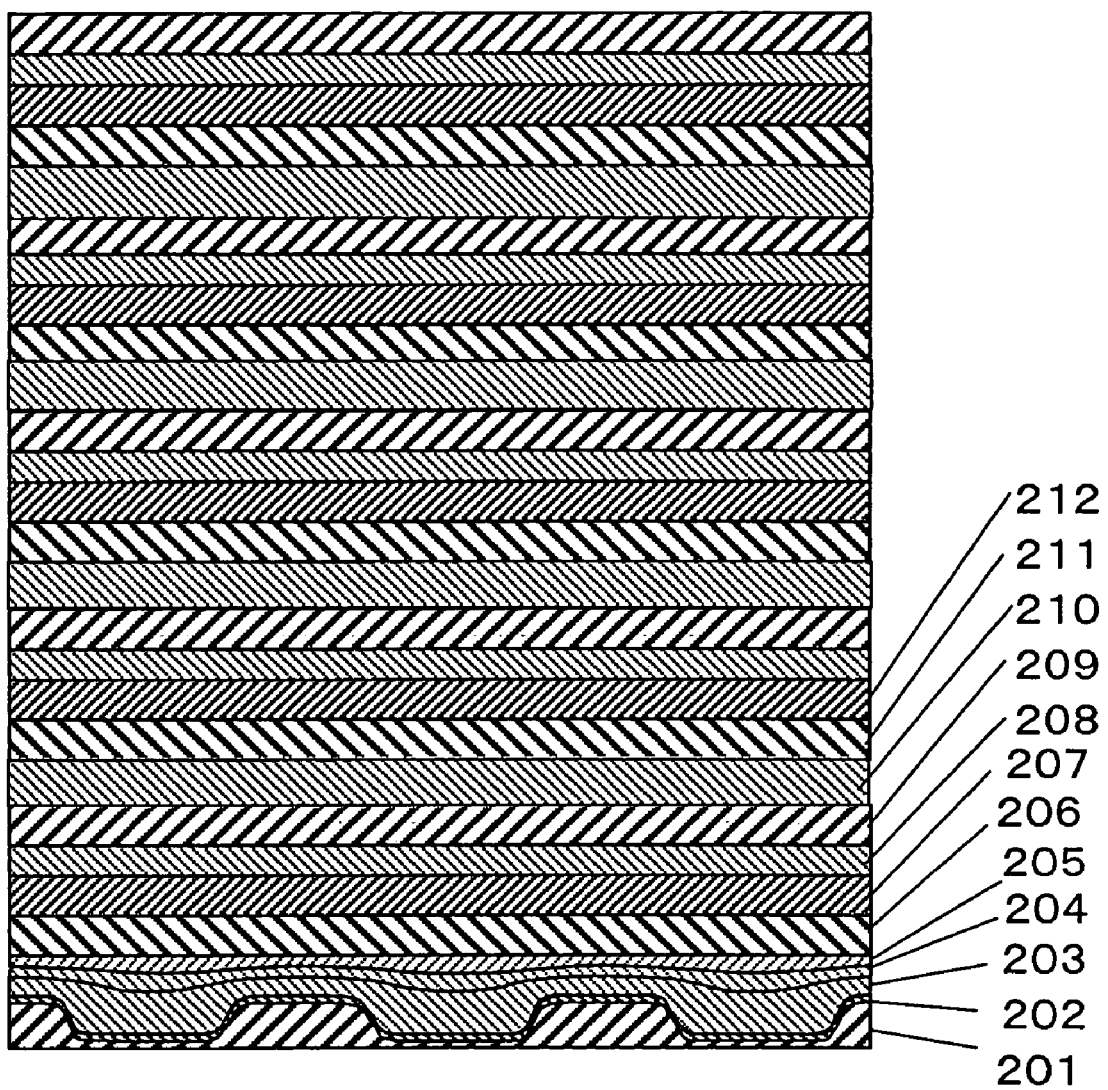
FIG. 17 is a cross-sectional diagram of a recording medium wherein the recording/playback layer has been smoothed according to one aspect of the invention.

In the recording medium, information is read from the substrate or top surface of the cover layer, and it has at least one of pits or grooves which allow tracking. As shown by the cross-section of FIG. 17, in layers for which the focusing error signal cannot be separated from the reflecting layer of the substrate top surface, the pits or grooves are shallow, and since the signal from the pits or grooves is small, precise focusing can be performed if there is no interference when at least one servo beam is autofocused on the substrate or the inner top surface of the cover layer. Specifically, after forming an Ag—Pd—Cu semitransparent reflecting layer on the substrate of this aspect, a low molecular weight acrylic resin is thinly coated to an average film thickness of 150 nm to submerge the pits or grooves so that their depth is ⅓ or less. Hence, the playback signal from the pits is strongly detected only from the servo layer, so the focal point may be adjusted so that the playback signal is increased. Alternatively, it is adjusted so that the push-pull signal from the grooves is increased.

As another method, firstly, control may be performed such that all layers are decolored, and the focusing error signal from the servo layer is input to the memory. Next, any desired layer is colored, the change in the focusing error signal is learnt, and at least one servo beam is autofocused on the servo layer even if there is a colored layer.

In a multilayer laminate, the grooves are shallow, and even if they deform, a weak push-pull signal is produced, so the position of the recording/playback beam may also be corrected using this feature. For the correction, a large pit may further be provided on the substrate top surface which is difficult to submerge by lamination, and the correction made using this signal. The correction is performed by giving a slight angular rotation to the optical head in a plane parallel to the disk. Alternatively, recording is actually performed by changing over to a signal recorded on a track where the recording/playback beam is situated. The read signal may also be logically corrected by correcting the address and performing playback signal processing. Further, two types of correction can be performed together i.e., a correction situated exactly on the track is performed mechanically by an actuator, and a discrepancy of one track or more is logically corrected.

According to this aspect, a continuous servo system with grooves was used, but it may also be a sample servo system with servo pits.

As shown by the schematic diagram of the device in FIG. 9, information from outside the recording device is transferred to an 8-16 modulator 3-8 in units of 8 bits. When the information is recorded on an information recording medium (hereafter, optical disk) 3-1, recording is performed by a modulation method wherein 8 bits of information are converted to 16 bits, i.e., the so-called 8-16 modulation method. According to this modulation method, information of 3T-14T mark lengths which are made to correspond with 8 bits of information, is recorded. The 8-16 modulator 3-8 in the figure performs this modulation. Here, T represents the clock cycle during information recording. The disk was rotated so that the speed relative to the light spot was a linear velocity of 15 m/s.

The 3T-14T digital signal converted by the 8-16 modulator 3-8 is split into beams by a distributor. Signals which were originally different such as for example the video and audio signals on television channels may of course be assigned to each beam and recorded in parallel. The recording signals of each beam are transferred to a recorded waveform generating circuit 3-6, and a multi-path recorded waveform is thereby generated.

At this time, the power level used to form the recording mark was 12 mW, and the reduced power level was 1 mW. Even if the linear velocity was changed from 8.2 m/s, there was not much variation within this range. Read was performed at 1 mW. When read was performed for a long time at a power exceeding 2 mW, the recorded data deteriorated. Also, in the aforesaid recorded waveform generating circuit, the 3T-14T signals are made to correspond alternately to "0" and "1" in a time sequence. At this time, areas irradiated by pulses of high power level become amorphous (mark parts). Also, the aforesaid recorded waveform generating circuit 3-6 has a multipath waveform table corresponding to a system (adaptive recording waveform control) wherein, when a series of high power pulses is formed to form the marks, the leading pulse width and trailing pulse width of the multipath waveform is varied according to the length of the spaces before and after the marks. Consequently, a multipath recording waveform is generated wherein the effect of inter-mark thermal interference which occurs between marks can be completely eliminated.

The recorded waveform generated by the recorded waveform generating circuit 3-6 is transferred to a laser driver 3-7, and the laser driver 3-7 causes the semiconductor laser in the optical head 3-3 to emit light based on this recorded waveform.

The optical head 3-3 installed in this recording device uses a semiconductor laser array having an optical wavelength of 680 nm as the information recording laser beam. This laser beam is focused on the recording layer in the aforesaid optical disk 3-1 by an objective lens having a lens NA of 0.65, and information is recorded by irradiating with the laser beam. The laser light can be irradiated through a substrate having a servo layer formed on its surface, or can be irradiated through a bonded substrate.

Figure 5:
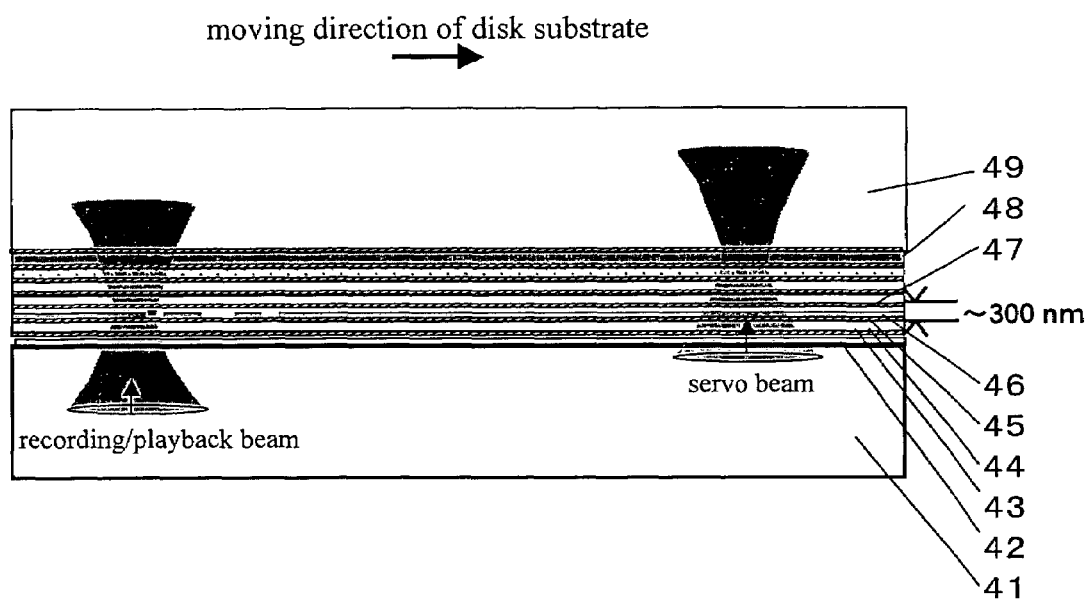
FIG. 5 is a diagram showing the focal point of two laser beams according to one aspect of the invention.

FIG. 5 shows the relation between two light spots formed with an array laser as optical source, and the recording medium. The optical head and position of the lens which forms part thereof are adjusted so that the focal point of the laser beam coincides with the servo layer of the recording medium. The positional adjustment of the lens is performed by a two-dimensional actuator known in the art in the focusing direction and tracking direction.

Recording is performed so that the electrochromic action of the film is lost or weakened, so that coloration does not occur even if a voltage is applied, so that coloration is delayed, or so that it has an absorption spectrum different from that prior to recording due to the action of the laser beam and/or current. The electrochromic material layer or solid electrolyte layer can be at least partially decomposed, or mutually dispersed with another layer so that the electrochromic action is lost, or the coloration/decoloration rate is delayed. If a material which easily crystallizes such as tungsten oxide or polyacetylene is used as the electrochromic layer, the electrochromic action may be lost or the coloration/decoloration rate may be delayed due to a phase change (crystallization or crystallinity variation). In the case of a phase change, rewrite is possible.

Playback of the recorded information is also performed by the aforesaid optical head. A playback signal is obtained by coloring the layer to be played back in the same way as for recording by the array laser, irradiating the laser beam on a recorded mark, and detecting the reflected light from the mark and a part other than the mark.

The amplitude of this playback signal is increased by a preamplifier circuit, and in a 8-16 demodulator 3-10, it is converted to 8-bit information every 16 bits. Due to this operation, playback of the recorded mark is completed.

If mark edge recording is performed on the aforesaid conditions, the mark length of the 3T mark which is the shortest mark is approximately 0.4 micrometers. The recorded signal contains dummy data consisting of repeated 4T marks and 4T spaces in the leader and trailer of the information signal. The leader also contains a VFO.

The signal modulation method may of course be a method other than 8-16 modulation.

This invention can be used in fields related to information recording/playback.

What is claimed is:

1. An information recording and/or playback device which irradiates an information recording medium having plural recording layers with light to perform recording and/or playback, said device comprising:
    first light irradiation means;
    second light irradiation means;
    an optical path changeable member installed midway in divergent optics irradiated by said first light irradiation means, which varies the optical path between said first light irradiation means and said information recording medium; and
    an actuator which drives said optical path changeable member so that the optical thickness of said optical path changeable member through which light irradiated from said first light irradiation means passes, changes according to the position of said recording layer where recording or reading is performed.

2. The information recording and/or playback device according to claim 1, wherein said first light irradiation means is used for recording to or reading from the recording layer of said information recording medium, and
    said second light irradiation means is used for reading a servo layer of said information recording medium.

3. The information recording and social playback device according to claim 1, wherein said optical path changeable member is installed before a position where the light irradiated from said first light irradiation means and the light irradiated from said second irradiation means are superimposed.

4. The information recording and/or playback device according to claim 1, wherein said optical path changeable member is installed at a position between said first light irradiation means and said second light irradiation means, and a collimator lens.

5. The information recording and/or playback device according to claim 1, wherein said optical path changeable member is stepped or Babinet-Jamin-compensator shaped.

6. The information recording and/or playback device according to claim 5, wherein said actuator drives said optical path changeable member so that the step of said step shape through which light irradiated from said first light irradiation means passes, is different, or so that the thickness of said Babinet-Jamin-compensator shape through which light irradiated from said first light irradiation means passes, is different, according to the position of said recording layer where recording or reading is performed.

7. The information recording and/or playback device according to claim 1, wherein said information recording medium comprises an electrochromic layer and an electrode layer for applying a voltage to said electrochromic layer, and
said device comprises voltage applying means which applies a voltage to said electrode layer.

8. An information recording and/or playback device which irradiates an information recording medium having plural recording layers with light to perform recording and/or playback, said device comprising:
first light irradiation means;
second light irradiation means;
an optical path changeable member installed midway in divergent optics irradiated by said first light irradiation means and said second light irradiation means, which varies the optical path between said first light irradiation means and said information recording medium; and
an actuator which drives said optical path changeable member so that the optical thickness of said optical path changeable member through which light irradiated from said first light irradiation means passes, changes according to the position of said recording layer where recording or reading is performed.

9. The information recording and/or playback device according to claim 8, wherein said first light irradiation means is used for recording to or reading from the recording layer of said information recording medium, and
said second light irradiation means is used for reading a servo layer of said information recording medium.

10. The information recording and/or playback device according to claim 8, wherein said optical path changeable member is installed before a position where the light irradiated from said first light irradiation means and the light irradiated from said second irradiation means are superimposed.

11. The information recording and/or playback device according to claim 8, wherein said optical path changeable member is installed at a position between said first light irradiation means and said second light irradiation means, and a collimator lens.

12. The information recording and/or playback device according to claim 8, wherein said optical path changeable member is stepped or Babinet-Jamin-compensator shaped.

13. The information recording and/or playback device according to claim 8, wherein said information recording medium comprises an electrochromic layer and an electrode layer for applying a voltage to said electrochromic layer, and
said device comprises voltage applying means which applies a voltage to said electrode layer.

14. The information recording and/or playback device according to claim 12, wherein said actuator drives said optical path changeable member so that the step of said step shape through which light irradiated from said first light irradiation means passes, is different, or so that the thickness of said Babinet-Jamin-compensator shape through which light irradiated from said first light irradiation means passes, is different, according to the position of said recording layer where recording or reading is performed.

* * * * *

UNITED STATES PATENT AND TRADEMARK OFFICE
CERTIFICATE OF CORRECTION

PATENT NO. : 7,542,396 B2  Page 1 of 1
APPLICATION NO. : 11/209648
DATED : June 2, 2009
INVENTOR(S) : Terao et al.

It is certified that error appears in the above-identified patent and that said Letters Patent is hereby corrected as shown below:

On the title page, item [54] and column 1, line 1 should read:
(54) INFORMATION RECORDING APPARATUS, INFORMATION RECORDING MEDIUM AND INFORMATION RECORDING METHOD Signed and Sealed this First Day of September, 2009

David J. Kappos
*Director of the United States Patent and Trademark Office*